Jan. 31, 1956  R. SONNBERGER  2,732,750
KNOT AND 1/2
Filed Sept. 4, 1952
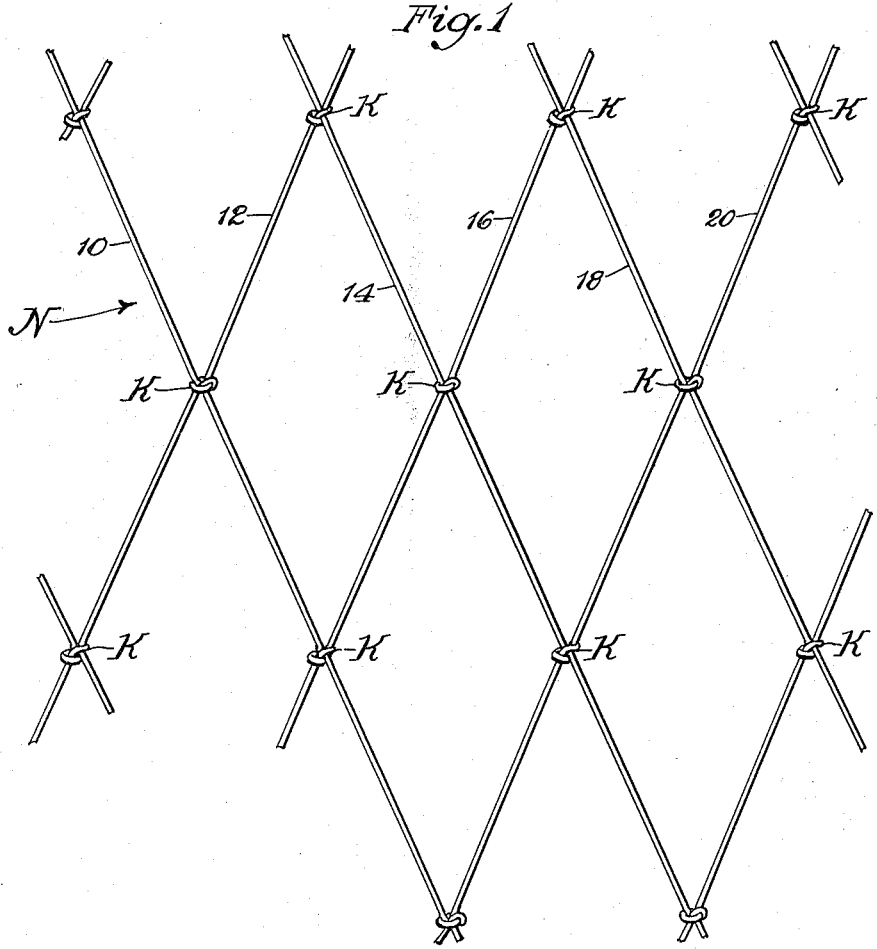
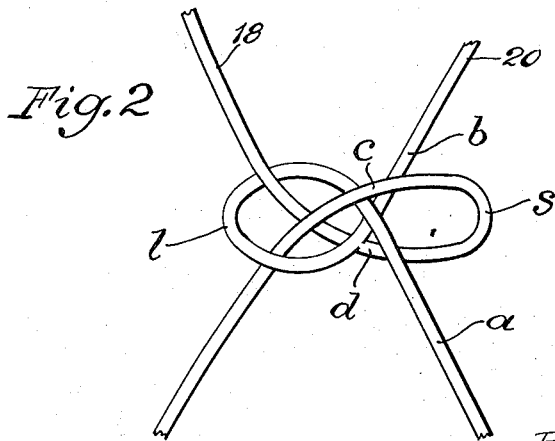
Inventor
Rudolph Sonnberger
by Parker & Carter
Attorneys

United States Patent Office 2,732,750
Patented Jan. 31, 1956

2,732,750

KNOT AND ONE HALF

Rudolph Sonnberger, Chicago, Ill., assignor, by mesne assignments, to The Linen Thread Co., Inc., Paterson, N. J., a corporation of Delaware Application September 4, 1952, Serial No. 307,793

2 Claims. (Cl. 87—12)

My invention resides in the field of nets, such as the nets used in fishing and trapping, tennis, badminton, volley ball, and other outdoor games. The knots used in these kinds of nets vary quite widely depending upon the type of use to be made of the net, the material from which the strands of the net are made, the conditions under which the net will be used, the strength necessary in the net necessitated by its application, and other factors. Various knots found suitable for one type of use are totally inappropriate in other fields in that they fail to achieve the requirements of that particular activity.

Possibly in nets the most important factor in their over-all utility, other than the material from which the strands of the net are made, is the knots themselves, in that ineffective or inappropriate knots can render the net ineffcient if not useless and possibly dangerous.

With the advent of new and improved materials that can be used in the strands of the net, the conventional knots are on occasion inappropriate in that the efficiency of a knot is ofttimes directly predicated upon the particular material being used.

Therefore, the primary object of my invention is a new and improved knot to be used in nets of all types, and descriptions, wherein the knot is economical from the standpoint of the cost of the machinery necessary to produce the same.

A further object of my invention is a new and improved knot to be used to secure two strands of line or twine together so as to acquire a firm and tight connection between the two, regardless of whether the line is made of conventional material, such as cotton or linen, or one of the new materials such as nylon.

Other objects will appear from time to time in the course of the ensuing specification and drawings, in which:

Figure 1 is a plan view of a section of a net employing my new knot; and

Figure 2 is a detail view showing one of these knots in an expanded or loosened condition.

In Figure 1, a section of net N is shown as composed of a plurality of strands vertically disposed, such as denoted by reference numerals 10, 12, 14, 16, 18, and 20. These strands are woven into a net, by conventional net-making machines, so as to be knotted together at equally spaced intervals, such as by a knot K, so that a regular symmetric pattern is formed from the strands of net to produce an even well-balanced net. Any one of a large number of knots can be used to connect the various strands together, and I have invented a knot for this purpose which is far more efficient than conventional knots in extensive use at the present time.

One of my new knots is shown in Figure 2 and represents the connection of a strand 18 and strand 20. Strand 20 has been formed into a loop $l$ which has legs $a$ and $b$ leading away therefrom. Strand 18 is composed of a strap portion $s$ which lies outside of the loop $l$ in strand 20 and resides between the legs $a$ and $b$ thereof. Leading from the strap portion $s$ in strand 18 are a pair of legs $c$ and $d$ which pass in opposite directions through the loop $l$ in strand 20 so as to cross one another. It should be noted that the leg $c$ as shown in Figure 2 passes over the top of the leg $d$. The leg $a$ of strand 20 passes over and lies on top of the leg $b$.

I have found that this particular type of knot is extremely effective when used in combination with threads or strands of nylon. When nylon was first used in nets of various types, it proved unsatisfactory in that the knots conventionally used with other materials would not hold nylon, and for several years the production of nets of nylon was hindered due to the fact that the knots used would not form a sufficiently tight connection. The explanation for this can probably be derived from the inherent characteristics of nylon material when formed in the threads or strands, but for purposes of my invention, the explanation of the slipping phenomena of nylon when knotted is unimportant.

When I state that this new and improved knot is particularly efficient when used with nylon, I do not wish to be restricted to this particular material in that my new and improved knot has proved to be extremely efficient when used with materials which have been employed in net-making for years, such as linen, cotton and the like.

While I have illustrated and described one form of my invention, it should be understood that I do not wish to be restricted to the particular embodiment shown and described in that my invention is susceptible of numerous changes and modifications without departing from its essential theme, and the hereinabove description and disclosure should be interpreted as only illustrative or diagrammatic of my invention's essential characteristics and should not be interpreted to restrict the same except as by the appended claims.

I claim:

1. A net formed from a series of strands knotted together at intervals, each knot being formed from a first strand 18 and a second strand 20, a loop $s$ being formed in the first strand 18 with an upper leg $d$ and a lower leg $c$, both of which lead away from said loop $s$, the upper leg $d$ and the lower leg $c$ crossing each other to form said loop $s$, a loop $l$ being formed in the second strand 20 with an upper leg $b$ and lower leg $a$, both of which lead away from said loop $l$, the upper leg $b$ and the lower leg $a$ crossing each other to form loop $l$, the legs $c$ and $d$ crossing each other within loop $l$, said leg $c$ crossing over leg $d$ where they cross each other within loop $l$, the legs $a$ and $b$ crossing each other within loop $s$, said leg $a$ crossing over leg $b$ where they cross each other within loop $s$, the upper leg $d$ passing under leg $a$ thence under leg $b$ thence under leg $c$ thence over leg $a$ and out of said loop $l$, the lower leg $c$ passing over leg $b$ thence over leg $a$ thence over leg $d$ thence under leg $b$ and out of said loop $l$, the upper leg $b$ passing over leg $c$ thence over leg $d$ thence under leg $a$ thence under leg $c$ and out of said loop $s$, the lower leg $a$ passing under leg $d$ thence under leg $c$ thence over leg $b$ thence over leg $d$ and out of said loop $s$, in the manner illustrated in Fig. 2.

2. A net constructed according to claim 1 wherein the material of the strands is nylon.

References Cited in the file of this patent

UNITED STATES PATENTS

| 183,016 | Moeller | Oct. 10, 1876 |
| 621,891 | Adams | Mar. 28, 1899 |
| 2,653,372 | Johnson | Sept. 29, 1953 |

FOREIGN PATENTS

| 273,060 | Switzerland | Apr. 16, 1951 |

OTHER REFERENCES

"The Ashley Book of Knots," Clifford W. Ashley (1946), page 263.